United States Patent [19]

Gautreaux

[11] 4,456,584
[45] Jun. 26, 1984

[54] SYNTHESIS OF SODIUM ALUMINUM HYDRIDE

[75] Inventor: Marcelian F. Gautreaux, Baton Rouge, La.

[73] Assignee: Ethyl Corporation, Richmond, Va.

[21] Appl. No.: 496,474

[22] Filed: May 20, 1983

[51] Int. Cl.$^3$ .............................................. C01B 6/24
[52] U.S. Cl. ................................................. 423/644
[58] Field of Search ........................................ 423/644

[56] References Cited

U.S. PATENT DOCUMENTS

| | | |
|---|---|---|
| 3,138,433 | 6/1964 | Guidice .............................. 423/644 |
| 3,210,150 | 10/1965 | Powers ............................... 423/644 |
| 3,387,933 | 6/1968 | Snyder ............................... 423/644 |
| 3,387,949 | 6/1968 | Snyder ............................... 423/644 |
| 3,505,036 | 4/1970 | Lindsay ............................. 423/644 |

FOREIGN PATENT DOCUMENTS

| | | | |
|---|---|---|---|
| 1084700 | 7/1960 | Fed. Rep. of Germany ...... | 423/644 |
| 1105167 | 3/1968 | United Kingdom ................ | 423/644 |
| 1185707 | 3/1970 | United Kingdom ................ | 423/644 |
| 186983 | 10/1966 | U.S.S.R. ............................... | 423/644 |

OTHER PUBLICATIONS

Zakharkin et al., "Acad. of Sciences, USSR, Proceedings", vol. 145, Aug. 1962, pp. 656–658.
Ashby et al., "Inorg. Chem.", vol. 2, No. 3, Jun. 1963, pp. 499–504.

Primary Examiner—Herbert T. Carter
Attorney, Agent, or Firm—Donald L. Johnson; John F. Sieberth; John F. Hunt

[57] ABSTRACT

To improve reactor throughput and raw material utilization, the direct synthesis process for producing sodium aluminum tetrahydride is conducted in a semicontinuous manner whereby in at least one run (and preferably in each of a plurality of successive runs) the reaction is conducted (and preferably the respective reactions are conducted) to a stage at or before which the reaction rate would begin to significantly decrease due to consumption of the sodium. At that stage at least a portion of the liquid reaction solution is separated from the unreacted aluminum and sodium to leave a highly active sodium- and aluminum- containing heel for use in initiating the ensuing run. Preferably the aluminum used in at least some of the runs contains a reaction-promoting amount of another metal such as titanium. Use of an ether reaction medium (which need not be pre-treated to remove small amounts of alcohols and/or water) is also preferred. Sodium aluminum tetrahydride is a well-known chemical reducing agent.

25 Claims, 1 Drawing Figure

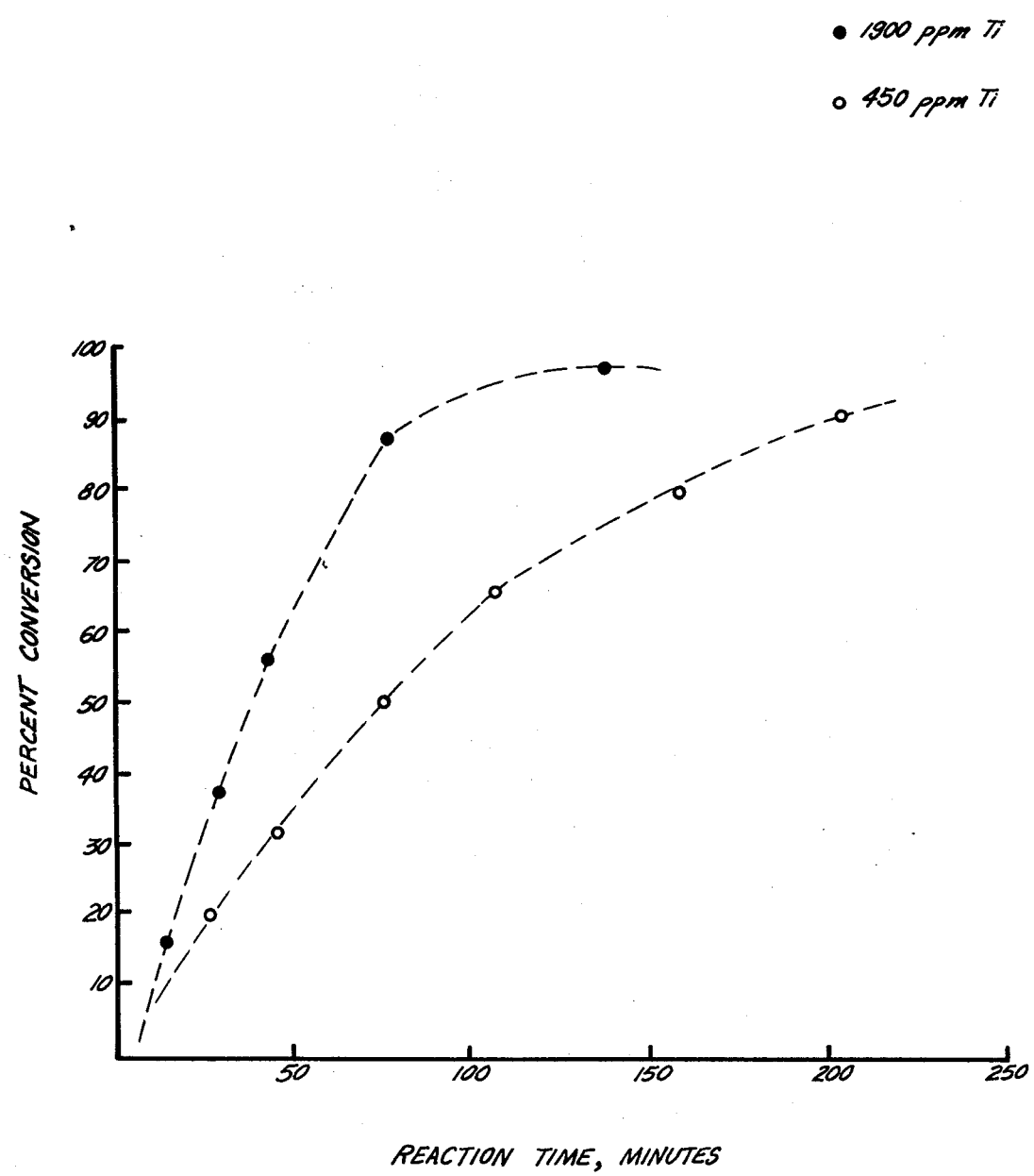

4,456,584

SYNTHESIS OF SODIUM ALUMINUM HYDRIDE

BACKGROUND

Of the known methods for synthesis of sodium aluminum hydride ($NaAlH_4$), the so-called "direct synthesis" process appears to offer the most promise. It involves reacting Na (or NaH), Al and $H_2$ under suitably elevated temperatures and pressures in an appropriate liquid reaction medium, such as an ether, amine or hydrocarbon. See in this connection:
- E. C. Ashby, Chem. Ind. (London), 208 (1962);
- E. C. Ashby et al., Inorg. Chem. 2, 499 (1963);
- E. C. Ashby, French Pat. No. 1,235,680 (May, 1960), and U.S. Pat. Nos. 4,045,545 and 4,081,524;
- J. Murib, U.S. Pat. No. 3,556,740;
- H. Clasen, Angew. Chem. 73, 322 (1961).

It has been suggested heretofore to conduct the direct synthesis reaction in such a way that the heel from one run is used to initiate the reaction in an ensuing run. See E. C. Ashby et al. (loc. cit.) at page 501. Nevertheless, the data presented in their Table IV indicate that a reaction conducted with aluminum recycled from a prior reaction was somewhat slower than a reaction conducted under the same conditions using aluminum powder activated by means of triethyl aluminum. And the recycled aluminum required a seven hour reaction period to achieve a 93 percent conversion of Na to $NaAlH_4$ even though the process was conducted at 140° C. and 2000 psi in diglyme.

In commercial operations, time is of the essence. The greater the reactor throughput, the lower the cost. A desirable contribution to the art, therefore, would be a way of increasing reactor throughput in the direct synthesis reaction.

Effective utilization of raw materials is also of paramount importance in commercial operations, especially where the raw materials are relatively expensive and the disposal of their residues is potentially hazardous and troublesome. Thus another desirable contribution to the art would be the provision of a direct synthesis process which not only exhibits increased reactor throughput but which achieves effective utilization of aluminum and sodium and avoids problems associated with their disposal.

It is believed that this invention fulfills the foregoing objectives in an efficient and economical manner.

CROSS-REFERENCE

Reference is made to co-pending application Ser. No. 450,032, filed Dec. 15, 1982 in the name of G. E. Nelson, and co-pending application Ser. No. 457,897, filed Jan. 14, 1983, also in the name of G. E. Nelson. Those applications and the present application are commonly assigned.

SUMMARY OF THE INVENTION

This invention provides distinct improvements in the direct synthesis process for producing $NaAlH_4$ wherein reaction is effected among sodium, aluminum and hydrogen at an elevated temperature and pressure in a liquid reaction medium in which sodium aluminum tetrahydride is soluble. The improvement comprises performing the reaction in a semi-continuous manner whereby in at least one run (and preferably in each of a plurality of successive runs) the reaction is conducted (and preferably the respective reactions are conducted) to a stage at or before which the reaction rate would begin to significantly decrease due to consumption of the sodium, and at that stage separating at least a substantial portion of the liquid reaction mixture from the solid residues to leave a sodium- and aluminum-containing heel for use in initiating the ensuing run.

While use may be made of any innocuous liquid reaction medium in which $NaAlH_4$ is soluble, a preferred embodiment of this invention involves use of an ether, most preferably a glycol dialkyl ether, notably the dimethyl ether of diethylene glycol (diglyme) or the dimethyl ether of ethylene glycol (monoglyme).

It is not necessary to carefully pre-dry or otherwise remove moisture and/or alcohol impurities from the reaction diluent prior to use in the process. In fact, in the initial run of the series the presence in the diluent of small amounts of water and/or alcohols is actually beneficial in that it promotes the initiation of the reaction and thereby can significantly shorten the induction period that would otherwise be experienced under the same conditions when using the diluent in pre-dried, alcohol-free form. Further details concerning the beneficial effect of a small amount of water and/or alcohol in the reaction diluent are set forth by G. E. Nelson in commonly assigned co-pending application Ser. No. 457,897, filed Jan. 14, 1983.

Pursuant to a preferred embodiment of this invention, there is provided in a process for the preparation of sodium aluminum tetrahydride by reaction among sodium, aluminum and hydrogen at an elevated temperature and pressure in a liquid reaction medium in which sodium aluminum tetrahydride is soluble, the improvement which comprises (i) performing the reaction in a semi-continuous manner whereby in at least one run (and preferably in each of a plurality of successive runs) the reaction is conducted (and preferably the respective reactions are conducted) to a stage at or before which the reaction rate would begin to significantly decrease due to consumption of the sodium, (ii) at that stage separating at least a substantial portion of the liquid reaction mixture from the solid residues to leave a sodium- and aluminum-containing heel for use in initiating the ensuing run, (iii) introducing into a reaction zone containing said heel, a fresh charge of sodium, aluminum, and said liquid reaction medium, and (iv) conducting an ensuing reaction among sodium, aluminum and hydrogen at an elevated temperature to prepare additional sodium aluminum tetrahydride.

It will be seen that the use of the process of this invention enables significantly enhanced reactor throughput and equipment utilization. In addition, the process makes efficient use of both of the relatively expensive raw materials, namely, sodium and aluminum. And, the potentially hazardous and troublesome disposal of the highly active sodium-containing residue is eliminated, since the ensuing reactions result in the consumption of such residues in forming the desired product.

The aluminum used in the various embodiments of this invention can be of various grades and purities and is preferably finely divided. Pursuant to a preferred embodiment the aluminum employed in at least some of the runs contains a reaction promoting quantity of at least one of the metals: titanium, zirconium, hafnium, vanadium, niobium, uranium. The presence in the aluminum of at least a reaction-promoting quantity of titanium is especially preferred. Further details concerning the desirability of using aluminum having a reaction promoting quantity of one or more of the foregoing metals are set forth by G. E. Nelson in commonly assigned co-pending application Ser. No. 450,032, filed Dec. 15, 1982.

The above and other features and embodiments of this invention will be still further apparent from the ensuing description, appended claims, and accompanying drawing.

BRIEF DESCRIPTION OF THE DRAWING

The FIGURE of the Drawing is a graphical presentation of reaction rate data obtained when conducting the direct synthesis process in diglyme at 140° C. and 1000 psig hydrogen, using finely divided aluminum containing in one case 450 ppm Ti and in another case 1900 ppm Ti.

DESCRIPTION OF PREFERRED EMBODIMENTS

As can be seen from the illustrative data plotted in the FIGURE, the direct synthesis reaction tends to proceed in two stages, an initial stage where reaction rate is relatively rapid and reasonably uniform, and a final stage where the reaction rate falls off due to consumption of the sodium. Thus in the case of the reaction run with aluminum containing 450 ppm of Ti, the rate of reaction began to slow down at about 65 percent conversion of Na to NaAlH$_4$. With the aluminum containing 1900 ppm Ti, the reaction proceeded at a faster rate and did not begin to level off until about 85 to 90 percent of the Na had been converted to NaAlH$_4$. However, thereafter the reaction was relatively sluggish.

Thus in accordance with this invention successive runs are conducted only long enough to take advantage of the most rapid initial stage. At or shortly before the stage is reached when reaction rate would begin to level off, a substantial portion of the solution of NaAlH$_4$ is separated from the solid residues in the reaction product by any suitable method such as decantation, filtration, or the like. The residue or heel which contains active aluminum and sodium is preferably kept in the same reactor to minimize handling, although it may be transferred to another reactor, if desired. Thereupon a fresh charge of Al, Na and solvent is introduced into the reactor containing the solid residue or heel and the ensuing pressure hydrogenation reaction performed to produce additional NaAlH$_4$. Because of its high activity, the solids residue or heel causes the next reaction to promptly initiate. It is preferable in each run to agitate the reaction mixtures to insure thorough contact among the reactants.

If desired, some of the runs of any given series may be carried out beyond the point at which the reaction rate tends to level off. While this procedure is not recommended as it results in less efficient reactor utilization, it nonetheless is technically and economically feasible so long as the majority of the runs of the series are performed as described above.

It will of course be realized that the curves shown in the FIGURE are merely illustrative—the reaction rate curve (percent conversion v. reaction time) will vary from case to case and depends, for example on the make-up and physical form of the aluminum, the relative proportions of Al and Na, the solvent, and the reaction conditions used. In general, however, when conducting the reaction with sodium as the limiting reactant, the reaction rate will usually begin to slow down somewhere between about 50 percent and 90 percent conversion of Na to NaAlH$_4$. Once the basic rate data have been obtained for the particular operating conditions and system selected for use, it is an easy matter to determine at what stage the runs should be discontinued for most efficient operation pursuant to this invention.

The aluminum for the process may be in any of several forms, preferably some comminuted form such as shavings, turnings, flakes, filings, etc. Most preferably, it is in the form of a fine powder. Although not essential, it is preferred that the aluminum contain a reaction-promoting amount of Ti, Zr, Hf, V, Nb, or U. Most preferably one or more of such metals is present in the aluminum as an alloy, although other ways of introducing such metal(s) into the reaction system to enhance reaction rate may prove successful.

A suitable range for the reaction-promoting quantity of metal is about 300–5000 parts by weight per million parts aluminum, although even higher quantities may be present. A preferred range is 450–2500 ppm. A more preferred range is about 1000–2000 ppm. The direct synthesis reaction generally proceeds at a faster rate with increased amounts of metal. The upper point of diminishing returns has not been determined. A particularly desirable and useful aluminum powder is sold under the trade designation I-783 by Reynolds Metals Company.

Of the reaction promoting metals Ti and Zr are preferred because of their widespread availability although in some instances U may be preferred where available as a waste source or the like. Other similar metals may prove to be equivalent for this purpose. Titanium is deemed the most preferred reaction promoter for the aluminum.

Among the features of this invention is the fact that high reactor throughput may be achieved even though aluminum containing a reaction-promoting quantity of Ti or the like is not used in each run. Because of the high activity of the aluminum- and sodium-containing heels and the carry-over effects of the process from run to run, it is possible to charge in a less expensive form of aluminum (low Ti, etc. content) in, say, every second or third run without greatly impairing the efficiency of the plant operation.

In each run the aluminum is preferably present in a stoichiometric excess of the amount of sodium being used. This excess is preferably such that the Al:Na gram-atom ratio is at least about 2:1, more preferably 3:1 or more. Use of such excesses of Al enhances the rate of the reaction once initiated.

As indicated above, each run is carried out in an innocuous liquid reaction medium in which NaAlH$_4$ is soluble or at least reasonably soluble, i.e., in a liquid medium that does not interfere with the direct synthesis process and in which at least a major portion of the NaAlH$_4$ product remains dissolved at the temperature used in separating the liquid reaction mixture from the solids residue or heel. While other materials (e.g., hydrocarbon solvents, etc.) may prove suitable for this purpose, ethers are preferred. Typical ethers include diethyl ether, ethylisopropyl ether, ethylisobutyl ether, dipropyl ether, ethylisoamyl ether, tetrahydrofuran, 1,4-dioxane, and the like. Mixtures of two or more different ethers may be employed as the reaction medium. In addition, one or more ethers may be utilized in combination with other suitable reaction media such as paraffinic, cycloparaffinic, and/or aromatic hydrocarbons. Exemplary hydrocarbons which may be used in this manner include heptane, octane, 2,2,4-trimethylpentane, nonane, decane, dodecane, cyclohexane, methylcyclohexane, 1,2-dimethylcyclohexane, toluene, o-xylene, m-xylene, p-xylene, ethylbenzene, 1,2,4-trimethylbenzene, tetrahydronaphthalene, petroleum ethers, and many others.

Of the various ethers that may be used in conducting the process, cyclic ethers such as tetrahydrofuran, methyltetrahydrofuran, dioxane and the like constitute a preferred category.

Most preferably, the reaction medium in each run is a glycol ether, especially a dilower alkyl ether of an alkylene glycol such as the dimethyl ether of ethylene glycol (monoglyme), the dimethyl ether of propylene glycol, the dimethyl ether of diethylene glycol (diglyme), the dimethyl ether of triethylene glycol (triglyme), the diethyl ether of ethylene glycol, and the like. The most desirable solvents are diglyme and monoglyme because of their relatively low cost, commercial availability and reaction stability.

Although different ether solvents may be employed in successive runs, it is preferable to use the same ether in each such run as this simplifies materials handling and procurement.

The process involves pressure hydrogenations conducted at pressures of at least about 100 psig (preferably at least about 700 psig) up to about 5000 psig. It is particularly preferred that the pressures of the successive runs fall withing the range of about 700 psig to about 2500 psig, most preferably about 900 to about 2000 psig. If desired, the pressures or pressure ranges may be varied from run to run.

While the direct synthesis reaction will proceed at relatively low temperature, use of elevated temperatures is preferred. Normally the runs will be conducted at a suitable temperature falling within the range of about 65° to 300° C. depending upon such factors as the pressure and reaction medium employed. A preferred range is 100°–200° C. and a more preferred range is 120°–170° C. As indicated by E. C. Ashby et al. (loc. cit.) the most desirable temperature for use in any given situation will be influenced by such factors as the pressure, reaction medium and reaction time being used. In general, however, temperatures of about 140° to about 160° C. are usually most preferred.

The reaction should be carried out so that product sodium aluminum tetrahydride is readily recovered. A suitable range of weight percent product tetrahydride in the reaction medium in each run is about 5–20 percent. A preferred range is 10–15 weight percent.

Each run is preferably conducted with sodium as the limiting reactant.

A suitable monohydric alcohol and/or water may be introduced into the initial reaction mixture of the initial (first) run in an amount sufficient to enhance reaction startup (i.e., to shorten the induction period that would otherwise be experienced absent the alcohol and/or water). Usually amounts of alcohols ranging up to about 10 mole percent and amounts of water ranging up to about 3 mole percent based on the amount of sodium charged will be sufficient, although somewhat higher amounts are feasible, though less preferred. Further details such as suitable alcohols which may be employed in this manner are set forth in co-pending Application Ser. No. 450,032, filed Jan. 14, 1983, the disclosure of which is incorporated herein.

The alcohol(s) and/or water may be introduced into the initial reaction mixture of some or all of the successive runs as an impurity in the ether being employed as the reaction medium, such as a glycol dialkyl ether. For example, unless highly purified, diglyme will usually contain small amounts of $CH_3OC_2H_4OC_2H_4OH$ and monoglyme will usually contain small amounts of $CH_3OC_2H_4OH$, the amounts being in the range of, say, 100 to 1000 ppm. Diglyme typically having about 150 ppm of water and about 500 ppm of $CH_3OC_2H_4OC_2H_4OH$ is available as an article of commerce from Grant Chemical Company.

It will of course be self-evident that the amount of alcohol and/or water introduced into the initial reaction system(s) will be limited so as not to consume an inordinate amount of the sodium charged nor to create a hazardous condition. Until considerable familiarity with the process has been achieved, it is recommended that one start in any given system with an essentially anhydrous reaction mixture and carefully meter therein a small measured amount of the alcohol(s) and/or water and in this way determine the smallest amount required to give the desired reaction promotion effect in the first run under the particular reaction conditions selected for use.

If desired, the aluminum used in the initial (first) run of the series may be activated by treatment with a suitable activating agent such as an aluminum alkyl.

As noted above, the process is conducted on a semicontinuous or cyclic basis with a reactive aluminum-containing heel or solid residue being carried through for successive cycles. All indications are that the cycles may be continued indefinitely without depletion of activating aluminum-containing material in the heel. This mode of operation makes it possible to recover the $NaAlH_4$ in the form of a very useful product solution, especially when an ether such as diglyme or monoglyme is employed as the reaction medium in each run.

A wide variety of techniques may be used for effecting the separation between the product solution and the solids residue or heel. By way of example, the reaction mixture may be allowed to settle and the supernatant solution of $NaAlH_4$ in the liquid reaction medium may be decanted off leaving an active aluminum- and sodium-containing heel in the reactor. Alternatively, the reaction solution may be subjected to filtration, centrifugation or the like under appropriate inert conditions so as to separate most of the $NaAlH_4$ product solution from the wet reaction residue (heel). The residue is preferably kept within the reaction zone and maintained therein under a dry, non-oxidizing atmosphere, but as noted above, the reaction residue may be transferred to another reactor for use in initiating a reaction therein. Naturally, in conducting this transfer the residue will be maintained under a dry, inert atmosphere, such as dry nitrogen, argon, or the like. A fresh charge of Na, Al and the liquid reaction medium is then introduced into the reactor and the next pressure hydrogenation reaction is conducted under the appropriate reaction conditions selected, and thereafter the separation and recharging procedures are again repeated. In each case, the active aluminum-containing heel will cause the ensuing reaction to initiate very rapidly. Thus it is not necessary in the practice of this invention to introduce additional reaction initiators such as water and/or alcohol(s) into the ensuing reaction mixtures. However, a feature of this invention is that the liquid medium being charged into these ensuing reactions need not be pre-dried and pre-purified to remove the small amounts of water and, at least in the case of glycol ethers, alcohol which the medium often contains. Thus the time, trouble and expense of such pre-purification operations can be avoided—reaction initiates and proceeds very well in the ensuing reactions notwithstanding the initial presence in the medium of the small amounts of water and/or alcohol.

In conducting the separation of the liquid reaction mixture from the solids residue or heel, the system may be kept at the same temperature as that used in the pressure hydrogenation reaction or it may be cooled or allowed to cool to a lower temperature, e.g., down as far as the prevailing ambient temperature, or even lower. In fact it is possible to increase its temperature for or during the separation, although ordinarily there are no particular advantages in doing so. It will thus be seen that the temperature of the system during the separation is not critical and may be varied within reasonable limits.

When performing the separation step the agitation will usually be stopped, but this is not essential. For example, use may be made of a separation technique such as vacuum filtration which is unaffected by the state of agitation of the system. The reaction system may be de-pressurized for the separation, but here again, this is not essential since the liquid reaction solution may be discharged from the reactor while under pressure.

The following examples are presented for the purpose of further illustrating the practice and advantages of this invention. In these examples successive pressure hydrogenation reactions were carried out in a 300 mL autoclave equipped with a turbine stirrer, a cooling coil, and internal thermocouple for measuring reaction temperature, and appropriate hydrogen pressurization and vent lines.

In the reaction series set forth in Example I, use was made of aluminum powder containing 450 ppm Ti and diglyme solvent which had been pre-purified by distillation from sodium aluminum tetrahydride.

EXAMPLE I

Into the autoclave where charged 110 mL diglyme, 8.0 grams (0.348 mole) of sodium and 35 grams of aluminum, and 5 mL triisobutyl aluminum (6.5 mole percent based on Na). The initial pressure hydrogenation run was carried out essentially to completion (about 91 percent conversion of Na to NaAlH$_4$). This initial reaction took 200 minutes. Since product solution free from organic contaminants was desired, the liquid reaction mixture formed in this initial run was discarded. The heel produced in this reaction was utilized in the first of a series of four pressure hydrogenation runs, the first three of which were carried out to a conversion of about 65 percent.

More specifically, to the heel remaining in the reactor and formed as above were added 0.313 mole of sodium, 0.344 mole of the aluminum powder, and 100 mL diglyme. The mixture was reacted with hydrogen at 140° C. and 1000 psig until the amount of hydrogen consumed was calculated to give approximately a 65 percent conversion of Na to NaAlH$_4$. The vessel was rapidly cooled, vented and the product solution decanted from the wet residue of solids. Three more runs were carried out, each using the heel from the prior run for reaction initiation. The second and third runs were each carried out to a calculated conversion of about 65 percent. The fourth and final run was carried essentially to completion. The quantities of materials and reaction times used in each of these four successive runs were as follows:

|  | Moles Na | Moles Al | Time (minutes) |
| --- | --- | --- | --- |
| Run 1 | 0.313 | 0.344 | 118 |
| Run 2 | 0.187 | 0.205 | 146 |
| Run 3 | 0.226 | 0.248 | 156 |
| Run 4 | 0.226 | 0.248 | 160 |
|  | 0.952 | 1.045 | 580 |

The product solutions from Runs 1 through 4 were combined and filtered yielding 552.7 grams of NaAlH$_4$ solution. Analysis of aliquots indicated a yield of about 100 percent sodium aluminum tetrahydride.

EXAMPLE II

Another series of runs was carried out as in Example I except that the aluminum powder used contained 1900 ppm Ti (I-783 from Reynolds Metals Company). In this series of runs, Runs 1, 2 and 3 (i.e., the runs following the initial run used to produce the heel for use in Run 1) were carried out to a conversion of Na to NaAlH$_4$ of about 75 percent. As in Example I, the pressure hydrogenations were carried out at 140° C. and 1000 psig. Run 4 was carried essentially to completion. The quantities of materials and reaction times used in Runs 1 through 4 are shown in the following table.

|  | Grams Na | Grams Al | Time (minutes) |
| --- | --- | --- | --- |
| Run 1 | 7.2 | 9.3 | 75 |
| Run 2 | 6.8 | 8.8 | 61 |
| Run 3 | 6.8 | 8.8 | 55 |
| Run 4 | 6.6 | 8.5 | 50 |

In Runs 1 through 4 a total of 1.19 moles of sodium and 1.31 moles of aluminum was used. Total reaction time in these runs was 241 minutes.

EXAMPLE III

In this instance three successive runs were carried out, the first of which was initiated by means of a heel produced in an earlier run from a pressure hydrogenation reaction in which aluminum containing 1900 ppm Ti was used. In the three successive runs aluminum containing only 190 ppm Ti was used. Thus the carry over effect from the use of the active aluminum and sodium containing residues from prior reactions was demonstrated. The first two of these runs (Runs 1 and 2) were carried to a sodium conversion of about 75 percent. The final run (Run 3) was carried to completion. In all runs diglyme distilled from NaAlH$_4$ was used as the solvent for the sodium aluminum tetrahydride product formed.

More specifically, to generate a heel for use in Run 1 the above autoclave was charged with 8.0 grams of sodium (freshly cut from cast brick), 35.0 grams of aluminum containing 1900 ppm Ti (I-783 powder from Reynolds Metals Company), and 110 mL diglyme. This mixture was reacted with hydrogen at 140° C. at 1000 psig to completion. After settling, the supernatant liquids were removed leaving a heel of approximately 0.948 mole of active aluminum. The supernate was discarded.

Run 1. To the heel formed as above were added 0.313 mole of sodium, 100 mL diglyme and 9.3 grams (0.344 mole) of aluminum powder containing 190 ppm Ti. The pressure hydrogenation was conducted at 140° C. and 1000 psig until accumulative pressure drop of 925 psig was observed indicating about 75 percent sodium depletion. The maximum rate of hydrogen consumption observed during this reaction was about 20 psig per minute. The reaction was conducted for a total of 81 minutes. After cooling the reaction mixture and allowing the solids to settle, the supernatant product solution was recovered by decantation.

Run 2. To the residual heel from Run 1 were added 100 mL diglyme, 0.259 mole of aluminum (190 ppm Ti) and 0.235 mole of sodium. As in Run 1, the reaction was conducted at 140° C. and 1000 psig hydrogen pressure to 75 percent depletion. The maximum hydrogen consumption rate observed was about 16.5 psig per minute. Once again the product solution was recovered by decantation.

Run 3. To the residual heel from Run 2 was added the same quantities of the same ingredients as in Run 2, and the pressure hydrogenation was carried out under the same conditions except that the reaction was carried to completion. The maximum rate of hydrogen consumption observed in this run was 13.3 psig per minute. The decanted product solution was combined with those from Runs 1 and 2 and subjected to analysis to verify the presence of sodium aluminum tetrahydride.

In this series of runs the rate of Run 1 was essentially equivalent to that of the heel-forming reaction in which the more expensive aluminum containing 1900 ppm Ti was used. The rates of Runs 2 and 3 were about 80 percent and about 65 percent that of the heel-forming reaction, respectively.

While this invention has been discussed primarily with reference to use of sodium as one of the initial reactants (and use of Na is definitely preferred), it is contemplated that the improvements described herein may be achieved when using sodium hydride instead of sodium.

As is well known in the art and reported in the literature, sodium aluminum tetrahydride is useful as a chemical reducing agent in a variety of applications.

It will now be clear to those skilled in the art that this invention is susceptible to considerable variation in its practice without departing from its true spirit and lawful scope.

I claim:

1. In a process for the preparation of sodium aluminum tetrahydride by reaction among sodium, aluminum and hydrogen at an elevated temperature and pressure in a liquid reaction medium in which sodium aluminum tetrahydride is soluble, the improvement which comprises performing the reaction in a semi-continuous manner whereby in at least one run the reaction is conducted to a stage at or before which the reaction rate would begin to significantly decrease due to consumption of the sodium, and at that stage separating a substantial portion of the liquid reaction mixture from the solids residue to leave a sodium- and aluminum-containing heel for use in initiating an ensuing run.

2. The process of claim 1 wherein said improvement is utilized in a plurality of successive runs.

3. The process of claim 1 wherein the liquid reaction product is withdrawn from the reaction zone and at least a portion of the solids residue is left in the reaction zone for use in initiating the ensuing run therein.

4. The process of claim 1 wherein the reaction medium is at least predominantly an ether.

5. The process of claim 1 wherein the reaction medium consists essentially of a glycol dialkyl ether.

6. The process of claim 5 wherein said ether is the dimethyl ether of diethylene glycol.

7. The process of claim 5 wherein said ether is the dimethyl ether of ethylene glycol.

8. The process of claim 4 wherein said ether consists essentially of tetrahydrofuran or methyltetrahydrofuran.

9. The process of claim 1 wherein the reaction medium is at least predominantly a mixture of a paraffinic, cycloparaffinic or aromatic hydrocarbon and an ether.

10. The process of claim 1 wherein the reaction temperatures of the successive runs fall in the range of about 120° C. to about 170° C.

11. The process of claim 1 wherein the pressures of the successive runs fall within the range of about 700 psig to about 2500 psig.

12. The process of claim 1 wherein the reaction medium is at least predominantly a glycol dialkyl ether, the reaction temperatures of the successive runs fall in the range of about 120° C. to about 170° C. and the pressures of the successive runs fall within the range of about 700 psig to about 2500 psig.

13. The process of claim 1 wherein the aluminum employed in at least the first run contains a reaction-promoting amount of at least one of the metals: titanium, zirconium, hafnium, vanadium, niobium, uranium.

14. In a process for the preparation of sodium aluminum tetrahydride by reaction among sodium, aluminum and hydrogen at an elevated temperature and pressure in a liquid reaction medium in which sodium aluminum tetrahydride is soluble, the improvement which comprises (i) performing the reaction in a semi-continuous manner whereby in at least one run the reaction is conducted to a stage at or before which the reaction rate would begin to significantly decrease due to consumption of the sodium, (ii) at that stage separating a substantial portion of the liquid reaction mixture from the solids residue, and (iii) utilizing at least a portion of the solids residue for initiating an ensuing reaction among sodium, aluminum and hydrogen.

15. The process of claim 14 wherein the reaction medium is at least predominantly an ether.

16. The process of claim 14 wherein said improvement is utilized in a plurality of successive runs.

17. The process of claim 16 wherein the reaction temperatures of the successive runs fall in the range of about 120° C. to about 170° C. and the pressures of the successive runs fall within the range of about 700 psig to about 2500 psig.

18. The process of claim 16 wherein the aluminum employed in at least some of the runs contains a reaction-promoting amount of at least one of the metals: titanium, zirconium, hafnium, vanadium, niobium, uranium.

19. The process of claim 16 wherein the aluminum employed in at least the first run contains a reaction-promoting amount of at least one of the metals: titanium, zirconium, hafnium, vanadium, niobium, uranium.

20. The process of claim 16 wherein the aluminum employed in the first and in at least some of the ensuing runs contains a reaction-promoting amount of titanium.

21. The process of claim 16 wherein said improvement is utilized in a plurality of successive runs in the same reactor.

22. The process of claim 21 wherein the reaction medium is at least predominantly an ether, the reaction temperatures of the successive runs fall in the range of about 120° C. to about 170° C., the pressures of the successive runs fall within the range of about 700 psig to about 2500 psig, and the aluminum used in at least some of the runs contains a reaction-promoting amount of at least one of the metals: titanium, zirconium, hafnium, vanadium, niobium, uranium.

23. The process of claim 21 wherein the ether reaction medium consists essentially of the dimethyl ether of diethylene glycol, the dimethyl ether of ethylene glycol, tetrahydrofuran, or a mixture of two or more of them, and the aluminum used in at least some of the runs contains a reaction-promoting amount of titanium.

24. The process of claim 22 wherein the reaction medium consists essentially of the dimethyl ether of ethylene glycol, the dimethyl ether of diethylene glycol, or a mixture of the two.

25. The process of claim 22 wherein the reaction medium consists essentially of the dimethyl ether of ethylene glycol, the dimethyl ether of diethylene glycol, or a mixture of either or both of them with a paraffinic, cycloparaffinic or aromatic hydrocarbon.

* * * * *

UNITED STATES PATENT AND TRADEMARK OFFICE
CERTIFICATE OF CORRECTION

PATENT NO. : 4,456,584
DATED : June 26, 1984
INVENTOR(S) : Marcelian F. Gautreaux It is certified that error appears in the above—identified patent and that said Letters Patent is hereby corrected as shown below:

Column 5, line 28, "withing" should read -- within --.
          line 64, "450,032" should read -- 457,897 --.

Signed and Sealed this

Fifth Day of February 1985

[SEAL]

Attest:

DONALD J. QUIGG

Attesting Officer     Acting Commissioner of Patents and Trademarks